UNITED STATES PATENT OFFICE.

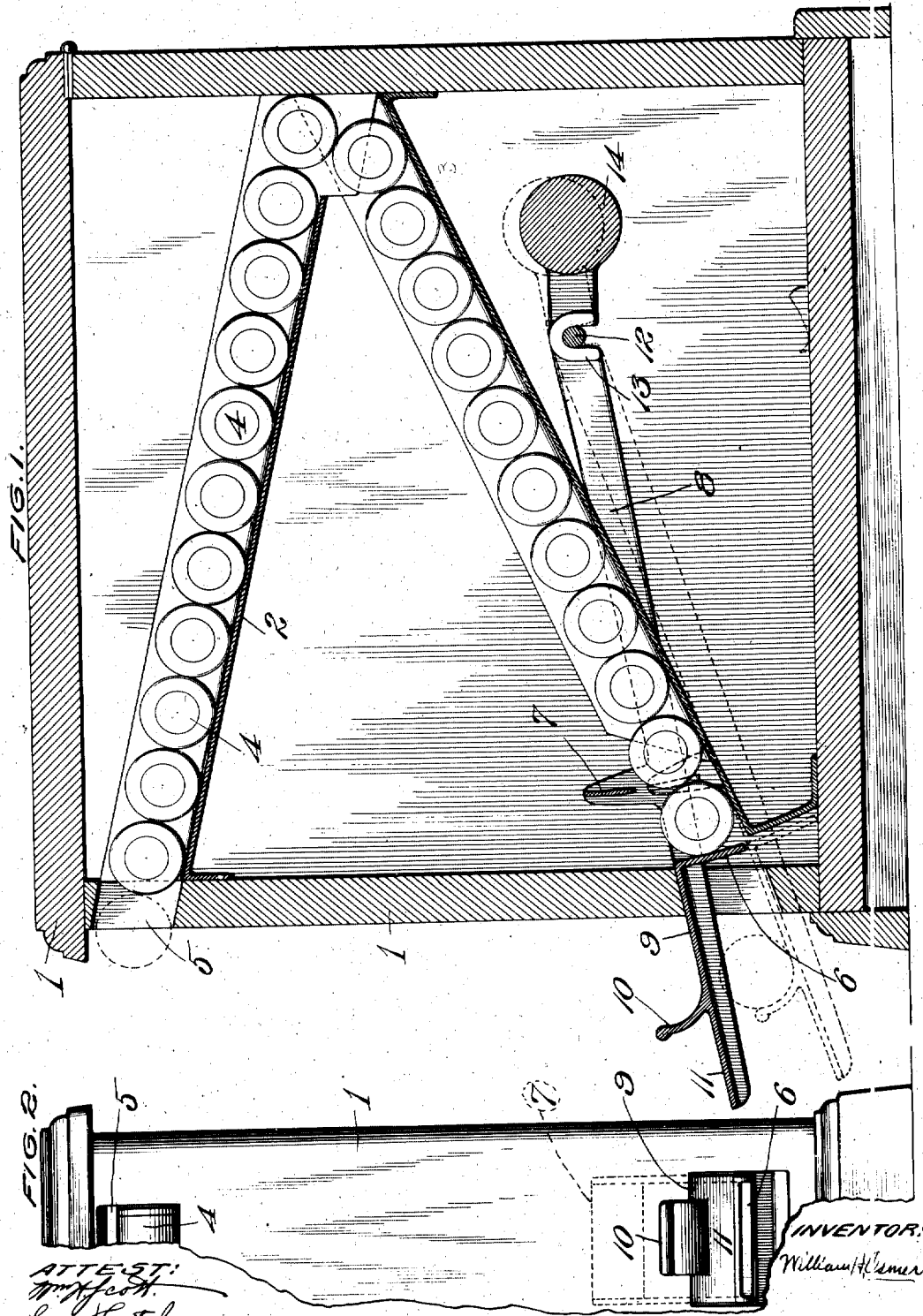

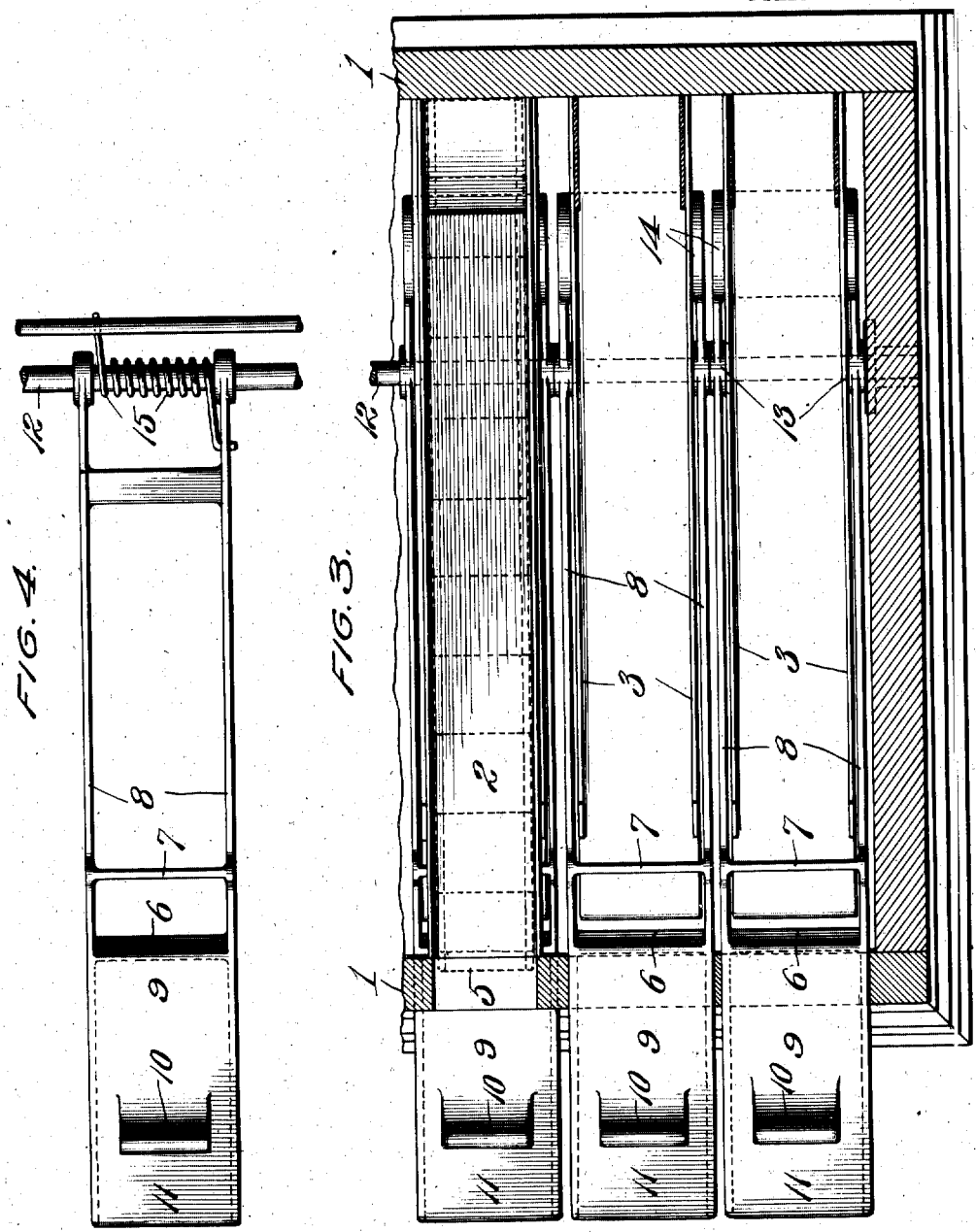

WILLIAM H. OSMER, OF VIGUS, MISSOURI.

SPOOL-CABINET.

1,008,429.

Specification of Letters Patent. Patented Nov. 14, 1911.

Application filed July 28, 1911. Serial No. 641,112.

*To all whom it may concern:*

Be it known that I, WILLIAM H. OSMER, a citizen of the United States, residing at Vigus, in the county of St. Louis and State of Missouri, have invented a new and useful Spool-Cabinet, of which the following is a specification.

My invention relates to improvements in spool cabinets, or containers, used in stores for dispensing spool thread and similar cylindrical commodities.

The objects of my invention are, first, to so construct a cabinet of this sort, that its contents may be readily received and released; and, second, to provide means to discharge and remove the object dispensed, by a direct operative depression stroke, requiring the use of but one hand.

To this end, my invention provides an improved releasing gate and a direct conjunctively operating cut-off gage, applied, spaced and adjusted to permit the release and discharge of the contents of the cabinet in single or other prescribed quantities and also, means for automatically closing the releasing gate to its normal position, when freed from operative pressure.

To enable others, skilled in the art to which my invention appertains, to make and use the same, I will now describe its construction and operation, reference being had to the accompanying drawings forming a part of this specification, and, in which—

Figure 1 is a vertical section of my improved spool cabinet; Fig. 2, is a fragmentary view in front elevation of the same; Fig. 3, is a horizontal sectional view, the upper portion of said figure being taken along the line of the upper roll-way, while the remaining portion of the figure is taken along the line of the lower roll-way; Fig. 4, is a plan view, showing a slightly modified form of a cut-off device, employed in carrying out my invention.

Similar numerals of reference, refer to similar parts throughout the several views.

1, represents a spool cabinet of the well known construction, having a hinged lid and containing an upper, or receiving spool roll-way 2, and the lower, or discharging spool roll-way 3. These roll-ways, 2 and 3, conform to an inclined plane, and are so constructed within the cabinet 1, that the lower ends, of the upper roll-ways 2 register with and discharge their contents into the upper ends of the lower roll-ways 3. The number and size of these roll-ways, will, of course, vary according to the size, and use required of the cabinet in which they are constructed to form a continuous roll-way passage for a file of spools 4, from the upper entry opening 5, to the lower discharge gate 6.

7, is a cut-off gage, mounted upon the swinging frame 8, of which, the discharge gate 6, receiving apron 9, stop 10, and finger-plate 11, in this instance, form an integral part. The cut-off gage 7, is so adjusted on the frame 8, as to rest in its normal position, above the row of spools 4, at a distance inwardly from the gate 6, sufficient to cut off, uniformly, one, or as many of the end spools in the roll-way, as may be desired, by depressing the top of the gate 6, to a plane permitting the spools to pass over it and out upon the apron 9, to the stop 10, from which they may be removed. The remaining spools in the roll-way 3, are then cut off simultaneously, and held back by the cut-off gage 7 which, if a continuous run of the spools from the rollway 3 is desired, may be dispensed with. The principal use, however, of my present invention, will be to discharge the spools singly. In this connection it will be noted that the spools, when they are discharged singly, lodge against the stop 10. With the hand resting upon the finger-plate 11 the spool is held by its ends by the thumb and finger and is then readily removed without any danger of soiling the thread.

Another and important feature of my present invention is that it requires the use of but one hand to completely operate it. Thus the other hand is left free for other service, a condition which is very desirable when a clerk is busily engaged. The swinging frame 8, is mounted upon an axle 12, suitably secured in the cabinet 1, below the rollway 3, in position to afford proper swinging facilities to the frame 8 which, in this instance, is applied and operatively secured on the axle 12, by the stride saddle bearing 13, as shown in Fig. 1. At the inner end of the swinging frame 8, the balance or tilting weight 14, is applied, and is of proper size to responsively and automatically swing the frame 8, and hold the gate 6, in a closed normal position.

A modified form of a hinged swinging frame, is also shown by use of the torsion spring 15, in Fig. 4, although, any known equivalents, or modified forms and sizes, in detail of construction of my present invention, may be adopted without departing from its general spirit.

Having thus described my invention, what I desire to claim, is—

In a cabinet for spools, an inclined rollway guide, provided at its outlet with a gate having a receiving apron extending outwardly upon a plane with its top and a stop thereon, secured near the free end of a swinging frame terminating at said end with a finger-plate and carrying an overhanging gage properly spaced inwardly from said gate to cut off in direct stroke therewith one or more objects at the end of the file in the rollway, the opposite end of said frame being pivotally supported within the cabinet to permit operation of the gate by depression of the finger-plate, and means connected with the frame for holding the gate in a closed normal position.

WILLIAM H. OSMER.

Witnesses:
ALVAN J. GOODBAR,
CHASE MORSEY.